United States Patent [19]

Moy

[11] Patent Number: 5,034,904
[45] Date of Patent: Jul. 23, 1991

[54] VISION SYSTEM ILLUMINATION CALIBRATION APPARATUS

[75] Inventor: Michael E. Moy, Lafayette, Colo.

[73] Assignee: Storage Technology Corporation, Louisville, Colo.

[21] Appl. No.: 401,976

[22] Filed: Sep. 1, 1989

Related U.S. Application Data

[62] Division of Ser. No. 148,616, Jan. 27, 1988, abandoned.

[51] Int. Cl.⁵ .................. G06F 15/46; G06F 15/64
[52] U.S. Cl. .................. 364/571.04; 364/516; 364/571.01; 364/579; 364/525
[58] Field of Search .............. 235/455, 462; 358/101, 358/102, 107; 360/92; 382/8, 10; 364/424.02, 513, 516, 525, 571.01, 571.02, 571.03, 571.04, 579

[56] References Cited

U.S. PATENT DOCUMENTS

| | | | |
|---|---|---|---|
| 3,517,167 | 6/1970 | Bell | 235/455 |
| 4,669,047 | 5/1987 | Chucta | 364/424.02 X |
| 4,760,609 | 7/1988 | Tamagari | 235/455 X |
| 4,864,511 | 9/1989 | Moy et al. | 360/92 X |
| 4,887,892 | 12/1989 | Bacus | 358/107 X |
| 4,908,777 | 3/1990 | Wolfe | 364/513 |
| 4,916,293 | 4/1990 | Cartlidge et al. | 358/101 |
| 4,937,690 | 6/1990 | Yamashita et al. | 360/92 |
| 4,944,022 | 7/1990 | Yasujima et al. | 382/10 X |

Primary Examiner—Kevin J. Teska
Attorney, Agent, or Firm—Dorr, Carson, Sloan & Peterson

[57] ABSTRACT

The vision system illumination calibration apparatus uses a pair of lamps, located one on either side of a vision element to illuminate a set of machine-readable characters imprinted in bar code format on a label affixed to a calibration target plate. The required level of illumination is set by the use of a predetermined calibration target label. The vision system is positioned opposite this calibration target label and the illumination level is varied in sequential steps. Control software identifies a range of illumination levels in which the calibration target label is accurately read by the vision element and sets the level of illumination of the lamps in this range of values.

5 Claims, 7 Drawing Sheets

VISION SYSTEM ILLUMINATION CALIBRATION APPARATUS

This is a divisional of application Ser. No. 148,616, filed Jan. 27, 1988, abandoned.

FIELD OF THE INVENTION

This invention relates to vision systems and, in particular, to a method of calibrating a source of illumination associated with a vision element such as a camera, to maximize the probability that the vision element will accurately identify a target consisting of a label imprinted with machine-readable characters.

PROBLEM

It is a problem in vision systems to accurately identify the presence of a target in the field of vision of the vision element. Accuracy of the vision system in determining the presence of a target is largely a function of the illumination of the target area in front of the vision element. A typical vision system makes use of a single source of illumination which is placed in an angularly displaced relationship to the vision element on opposite sides of the center line of the target. In this fashion, light generated by the source of illumination strikes the target on an acute angle and is reflected off the target with the same acute angle. The vision element is placed in the same angular relationship as the source of illumination with respect to the target but on the opposite side of the center line of the target so that the light reflected off the target is detected by the vision element. There are a number of problems with the use of a single source of illumination and these are glare off the target, shadows and inconsistent lighting of the target. This is particularly a problem when the target is a machine readable label that contains machine readable characters such as a bar code. This problem is further compounded in the case where the target is a fixed object and the vision element and its associated source of illumination are moveable on the end of a robot arm.

SOLUTION

These problems are solved and a technical advance is achieved in the field by the vision system illumination calibration apparatus which provides a precision calibration capability to a vision system which is located on the end of a robot arm. In particular, the subject apparatus is located in an automated magnetic tape cartridge library system. The library system consists of two concentrically arranged cylindrical arrays of magnetic tape cartridge storage cells. A robot arm, pivotally rotatable about the center of the concentrically arranged cylindrical arrays contains a magnetic tape cartridge retrieval mechanism. The magnetic tape cartridge retrieval mechanism is located between the two concentrically arranged cylindrical arrays of magnetic tape cartridge storage cells for retrieving and replacing magnetic tape cartridges in the storage cells. The inner and outer cylindrical arrays of magnetic tape cartridge storage cells are arranged to be loaded from the common area between the two cylindrical arrays so that the tape cartridge retrieval mechanism accesses both cylindrical arrays from this area.

The vision system, with its associated source of illumination, is located at the end of the robot arm and is used to both calibrate the location of the robot arm with respect to the magnetic tape cartridge storage cells and to read a machine-readable label imprinted on the magnetic tape cartridges stored in the magnetic tape cartridge storage cells to identify which magnetic tape cartridge is stored therein. Since the robot arm rotates about the center pivot point and the entire mechanism moves vertically as well to access all of the layers of the magnetic tape cartridge storage cells, the vision system must be highly accurate so that the location of the robot arm is precisely determined. In addition, the machine-readable label imprinted on the end of a magnetic tape cartridge stored in one of the magnetic tape cartridge storage cells must be accurately read to determine whether this is the appropriate volume to be retrieved by the robot arm from the magnetic tape cartridge storage cell.

In order to provide the accuracy required of this robot system, the vision system is equipped with two sources of illumination comprising a pair of lamps each located on either side of the vision element. The two lamps are angularly displaced inwardly to focus on a rectangular shaped area in the vision element line of sight so as to properly illuminate a machine-readable label and a position calibration target located a predetermined distance from the lens of the vision element. A vision system calibration apparatus is provided to regulate the light output of the sources of illumination for this vision system so as to maximize the probability of accurately reading the machine-readable label imprinted on the end of the magnetic tape cartridge as well as to properly illuminate a target area on the magnetic tape cartridge storage cells so that the robot arm position can accurately be determined.

The vision system is calibrated by positioning the vision element opposite a white target, then increasing the level of illumination to the maximum level to verify that the vision element consistently detects a white background. The vision system is repositioned opposite a black target, then the level of illumination is decreased to a minimum level to verify that the vision element consistently detects a black background. The vision system is finally repositioned opposite a predetermined calibration target label that has a series of machine-readable characters imprinted thereon. The level of illumination is maintained at a constant level in one lamp while the level of illumination in the second lamp is varied from a minimum level to a maximum level in a fixed number of steps.

At each level of illumination, the vision element output is compared with a set of data stored in a memory, which data is representative of the machine-readable characters imprinted on the calibration target label. Control software determines at what levels of illumination the calibration target label is accurately read by the vision system. The control software identifies the range of illumination levels between the maximum level and the level of illumination at which the vision system first consistently accurately reads the machine-readable characters on the calibration target label. The control software selects a level of illumination within this range, for example mid-range. The vision system then uses this selected level of illumination so that the vision system accurately responds to the machine-readable characters imprinted on the labels affixed to the end of the magnetic tape cartridges stored in the magnetic tape cartridge storage cells in the automated magnetic tape cartridge library system.

BRIEF DESCRIPTION OF THE DRAWING

This invention is illustrated in the attached figure in which.

DETAILED DESCRIPTION

Figure 2:
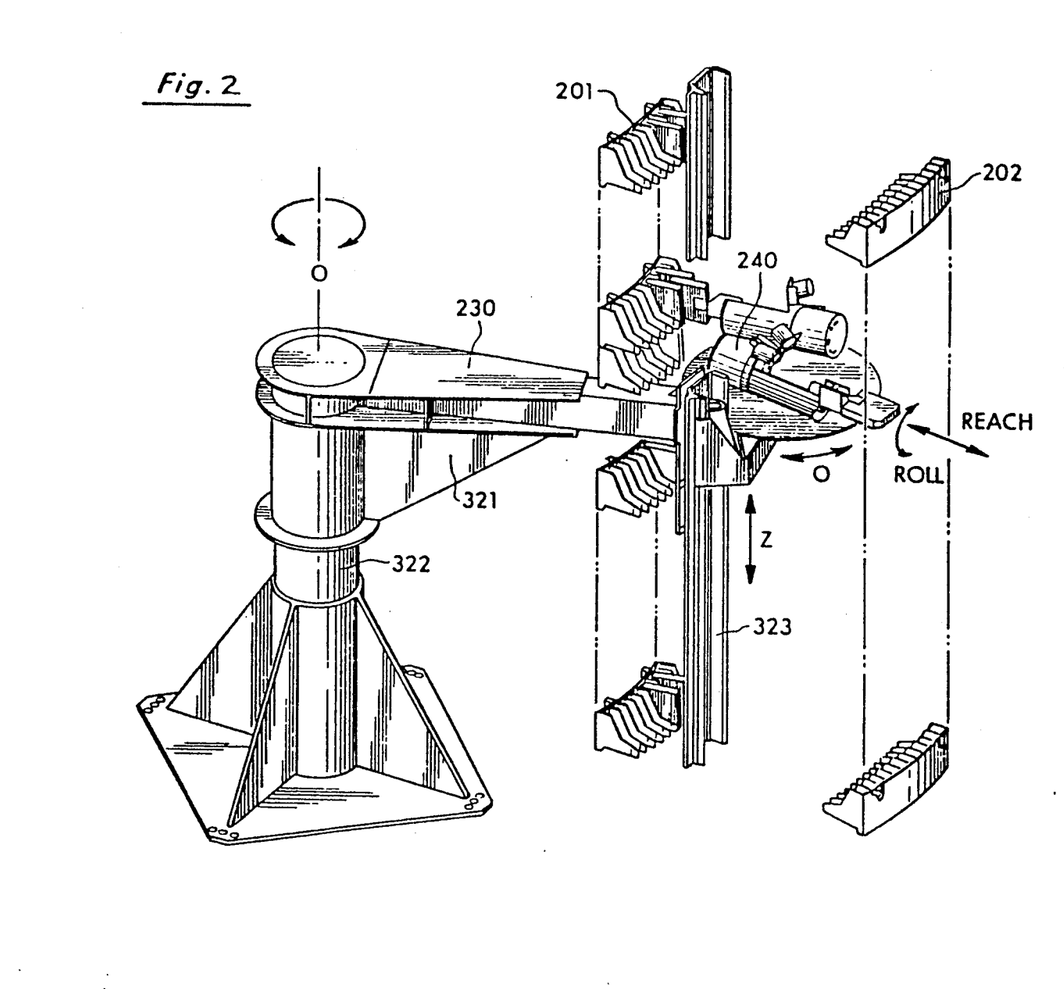
FIG. 2 is a perspective view of the robot arm system.

FIG. 2 illustrates a perspective view of the robot arm assembly 230 on which the vision system is mounted. Robot arm assembly 230 consists of a plurality of mechanisms all operating in conjunction to provide a moveable arm for retrieving magnetic tape cartridges from their individual storage cells. The tape cartridge storage array consists of inner 210 and outer 220 cylindrical arrays of tape cartridge storage cells. The robot arm 230 consists of an arm assembly including a theta arm 321 rotatably mounted on a support column 322 which is attached to the floor plates 312 of a library module. The arm assembly includes a Z mechanism 323 attached to the end of theta arm 321 remote from support column 322. The Z mechanism 323 has coupled thereto a wrist and finger assembly 240 which performs the magnetic tape cartridge retrieval from the storage cell. The Z mechanism 323 provides a vertical range of motion for the wrist and finger assembly 240 to access various vertical levels (rows) of the tape cartridge storage cell array. Theta arm 321 locates the Z mechanism 323 and its associated wrist and finger assembly 240 in the proper location (column) to access the tape cartridge storage cells. The robot arm support column 322 includes a motor which causes theta arm 321 of the robot arm 230 to rotate about the pivot point A of the robot arm 230 so that the robot arm 230 can access all of the tape cartridge storage cells which are located in a circular array about the pivot point A.

Figure 1:
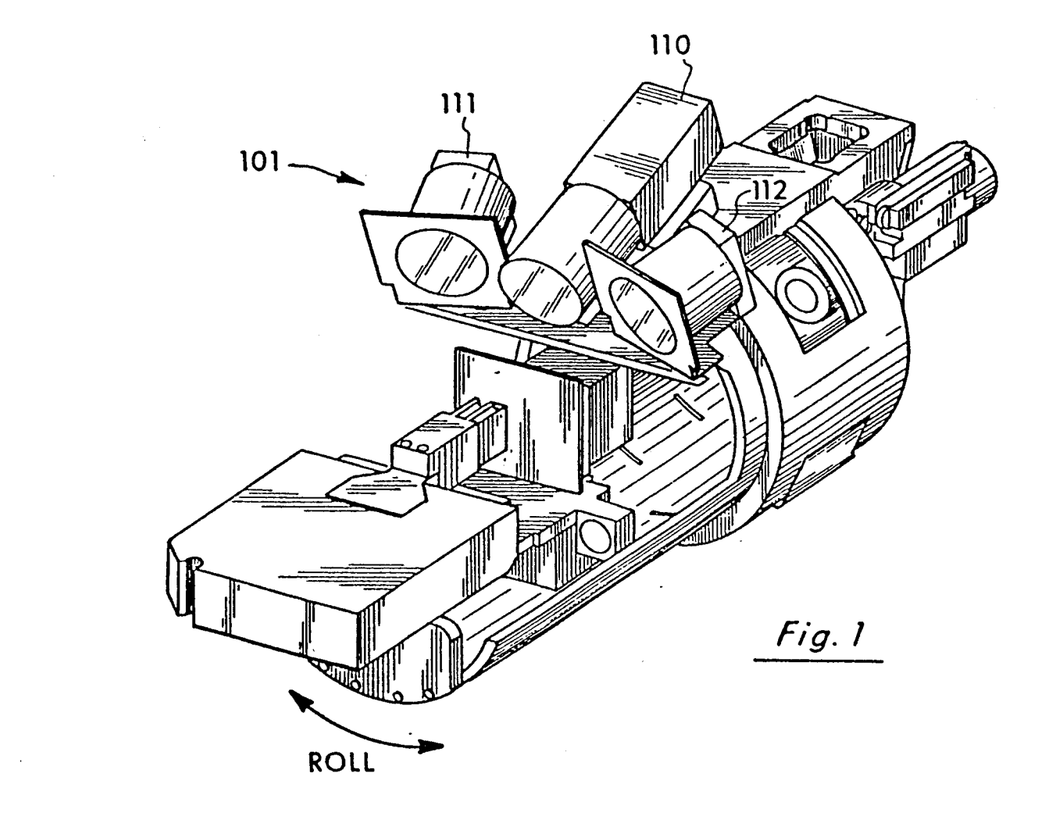
FIG. 1 is a perspective view of the vision system and its sources of illumination which are positioned at the end of the robot arm.

FIG. 1 illustrates the wrist and finger assembly that is located at the end of theta arm 321. The wrist and finger assembly consists of a plurality of mechanisms that perform the roll and reach function for the robot arm. The finger assembly can be rotated through a full 360 degree rotation by a roll mechanism which implements the wrist function. The finger assembly consists of a gripper mechanism that can be extended to reach the magnetic tape cartridge stored in the tape cartridge storage cell, grasp the magnetic tape cartridge and retrieve it out of the storage cell. The exact operation of these mechanisms is not disclosed in any further detail as they are not critical to the operation of the vision system illumination calibration apparatus disclosed herein.

Vision System

A vision system 101 located on the wrist (roll) assembly is illustrated in FIG. 1. Vision system 101 is located on the top of the wrist assembly and is focused on a rectangular-shaped area a predetermined distance in front of the finger assembly when the finger assembly is fully retracted. The point of focus of vision element 110 coincides with the position of a machine-readable label imprinted on the end of the magnetic tape cartridge stored in a magnetic tape cartridge storage cell. This focus is such that the vision element can read both the label imprinted on the end of the magnetic tape cartridge that is stored in the tape cartridge storage cell as well as a positioning target associated with the tape cartridge storage cell.

In order to enable vision element 110 to read the label on the magnetic tape cartridge, a source of illumination is provided. The source of illumination consists of pair of lamps 111, 112 arranged one on either side of vision element 110, and aligned in substantially the same orientation as vision element 110. Lamps 111 and 112 are directed so that the light beams emanating from these two lamps illuminate a rectangular-shaped area in the line of sight of vision element 110, which area coincides with the position of the label on the end of the magnetic tape cartridge. Thus, the illumination provided by the two lamps 111 and 112 is evenly distributed across the label on the magnetic tape cartridge so that vision element 110 can accurately read the machine readable characters imprinted on the label.

Machine-Readable Label

Figure 4:
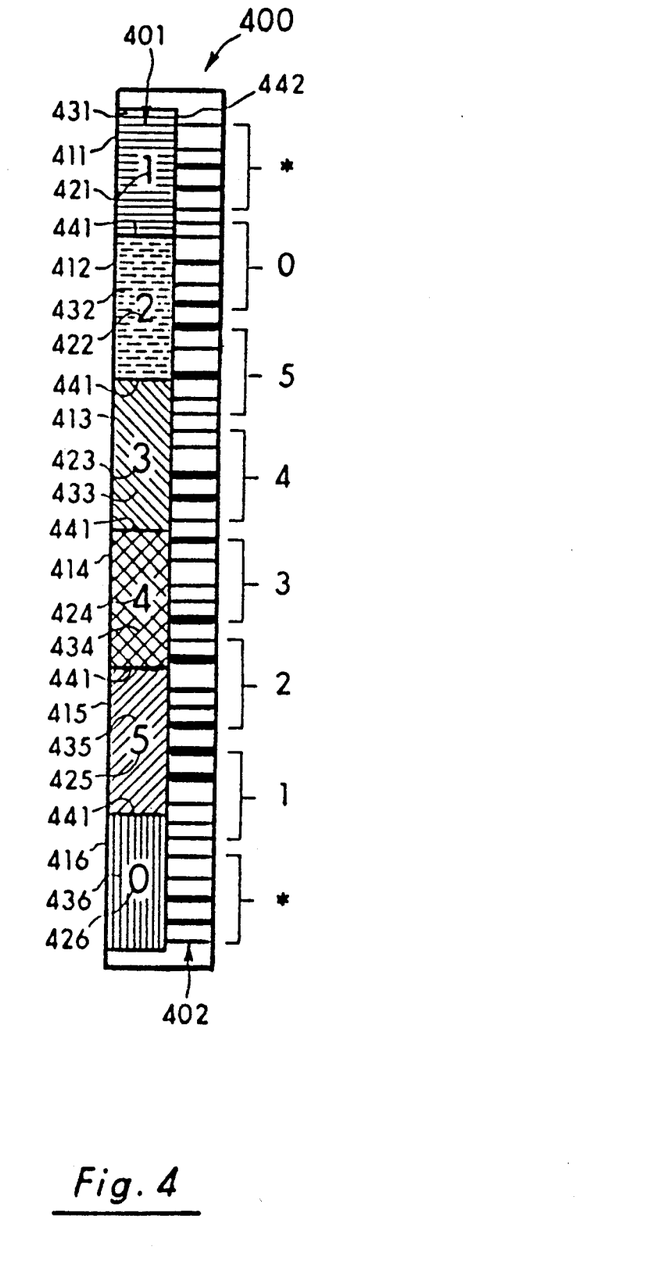
FIG. 4 illustrates a typical label format that can be used in this system.

FIG. 4 illustrates a typical label 400 that can be used on the magnetic tape cartridges in the automated magnetic tape cartridge library system. The label 400 incorporates a machine readable and human readable coding system. The first vertical column 401 of characters imprinted on the label 400 is divided into a series of vertically aligned, rectangular segments 411-416 each of which are separated from a contiguous other by a printing trap comprising a solid line 441. The rectangular segments are also separated from a second vertically aligned column 402 of characters adjacent to and coextensive with the first vertical column 401 of characters by another printing trap 442 comprising a solid line. One character 421-426 of a machine-readable and human-readable code is located within each rectangular segment 411-416 in the first column 401 of characters thereby forming a message in a first code. The second vertical column 402 contains a single rectangular segment containing a string of characters in a machine-readable code such as a bar code. This string of characters in the second vertical column 402 comprises a message in a second code which is identical to the message formed in the first vertical column 401 in the machine-readable and human-readable code. In addition, the background 431-436 of each of the rectangular segments 411-416 contained within the first vertical column 401 are suitably color coded to correspond to the respective characters 421-426 of machine-readable and human-readable code contained therein, thereby providing a message in a third code which is identical to the above-described messages of the first and second codes. The two vertical columns 401, 402 of characters imprinted with the first and second codes are so arranged for redundancy purposes. The message (1, 2, 3, 4, 5, 0) in the first vertical column 401 are printed to be read downwardly from top to bottom while the bar code (*, 1, 2, 3, 4, 5, 0, *) in the second vertical column 402 is printed to be machine readable upwardly in the reverse direction. In this manner, the label 400 may be used to accurately identify a magnetic tape cartridge in spite of the absence of a portion of the label 400. For example, if the bottom segment of the label 400 were missing, the vision system 101 would be able to read the first portion of the first code and the last portion of the second code. By combining these two readable segments of the first and second codes, the complete code on the label 400 can therefore be reconstructed by the vision system 101.

It is obvious from this configuration of the label 400, that proper illumination is required for the vision system 101 to be able to distinguish the machine readable bar code characters imprinted thereon. In the particular application discussed above, a pass scanning arrangement is used. The entire label 400 is illuminated by the source of illumination 111, 112 associated with the vision system while the illuminated image is focused on an array of photo detectors. such as a charge coupled device (CCD) that comprises the vision element 110. The image of the dark bars of the bar code will fall on some of these photo detectors while the light spaces will fall on other of the detectors. An electrical signal is applied to the charge coupled device array of photo detectors 110 and the light value at each photo detector is sequentially read out. Thus, the signal from the charge coupled device array can be processed and decoded in the same way as the signals produced in an active scanning system. An RS-170 type of signal is thereby obtained as the output of the vision system 101. It is imperative, however, that sufficient balanced light be applied to the entire label so that the charge coupled device photo detectors will respond to the variation in dark and light areas caused by the presence of the bar code characters.

Illumination Source Control Circuit

Figure 5:
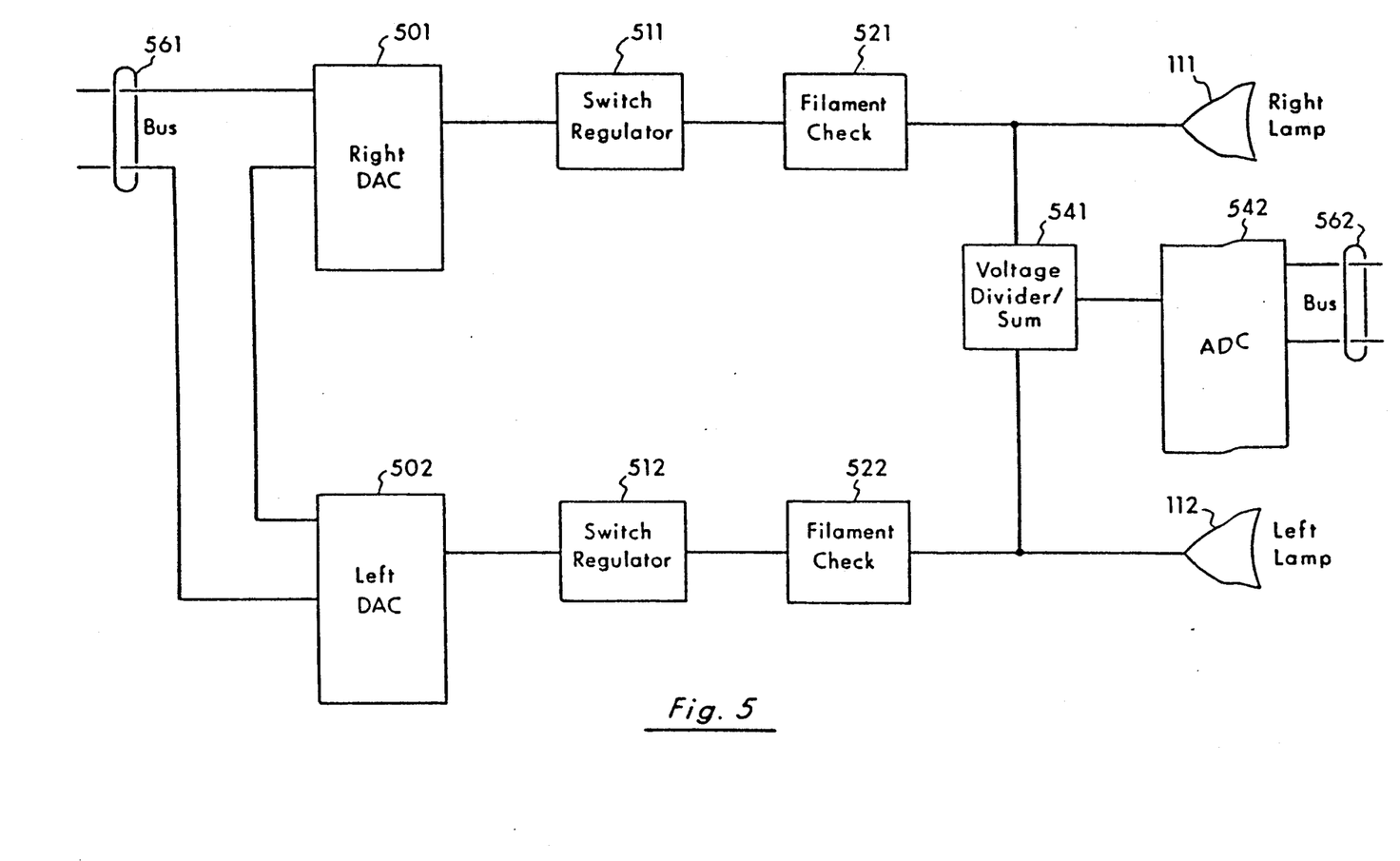
FIG. 5 illustrates a control circuit that is used to activate the sources of illumination in this vision system.

FIG. 5 illustrates in block diagram form the control circuit for the source of illumination. This circuit consists of a pair of digital to analog converters 501, 502; a pair of switch regulators 511, 512; filament check circuit 521, 522; a voltage monitor circuit 541; analog to digital converter 542; and right lamp 111 and a left lamp 112. Lamps 111 and 112 are located one of each side of the vision element 110. Lamps 111 and 112 are operated under software control as will be disclosed hereinbelow. The control software is located in a robot arm control unit (not shown) that outputs a digital signal on bus 561 to control the level of illumination of lamps 111, 112. Digital interface to bus 561 is an 8 bit digital to analog converter 501, 502. Digital to analog converter 501, 502 are 8 bit D latch digital to analog converters that are equipped with a common reset. The control software loads data into each one of the digital to analog converters 501, 502 by way of data bus 561. Data is read individually to each one of the digital to analog converters 501, 502. The data read into digital to analog converts 501, 502 are not read back onto bus 561 but rather are converted to a voltage at the output of digital to analog converters 501, 502 which analog voltage is used by switch regulator 511, 512 to drive lamp 111, 112. Switch regulators 511, 512 are a commercially available unit such as the LM 3578 switch regulator. The switch regulator has a gain of approximately 10 which converts the analog signal output by the corresponding digital to analog converter to higher voltage signal to drive the corresponding one of lamps 111, 112. The lamps are Sylvania type quartz halogen flood lamps used to illuminate the label 400 affixed to the end of the magnetic tape cartridge as well as the positioning target attached to the associated tape cartridge storage cell. Interposed between each switch regulator 511, 512 and the corresponding lamp 111, 112 is a filament check circuit 111, 112 which monitors the corresponding lamp 531, 532 to insure that the lamp is in operating condition. This is accomplished by filament check circuit 521, 522 using a diode in series between switch regulator 511, 512 and lamp 111, 112. A comparator is bridged across the two terminals of the diode to monitor the voltage differential therebetween. If the filament in lamp 111, 112 breaks, the voltage on both sides of the diode becomes equal and the output of the comparator reflects the absence of current through the diode. This simple circuit thereby indicates the operational state of the corresponding lamp. An additional measure of operational status is provided by voltage monitor 541 and analog to digital converter 542. The lamp voltage on lamps 531 and 532 are compared by voltage monitor 541 by means of a combined voltage divider and summing circuit. This allows both voltages to be read back through one channel by means of analog to digital converter 542. The analog to digital converter 542 creates a digital signal to be output on bus 562 as an indication of the operational status of lamps 111, 112.

Calibration Targets

Figure 3:
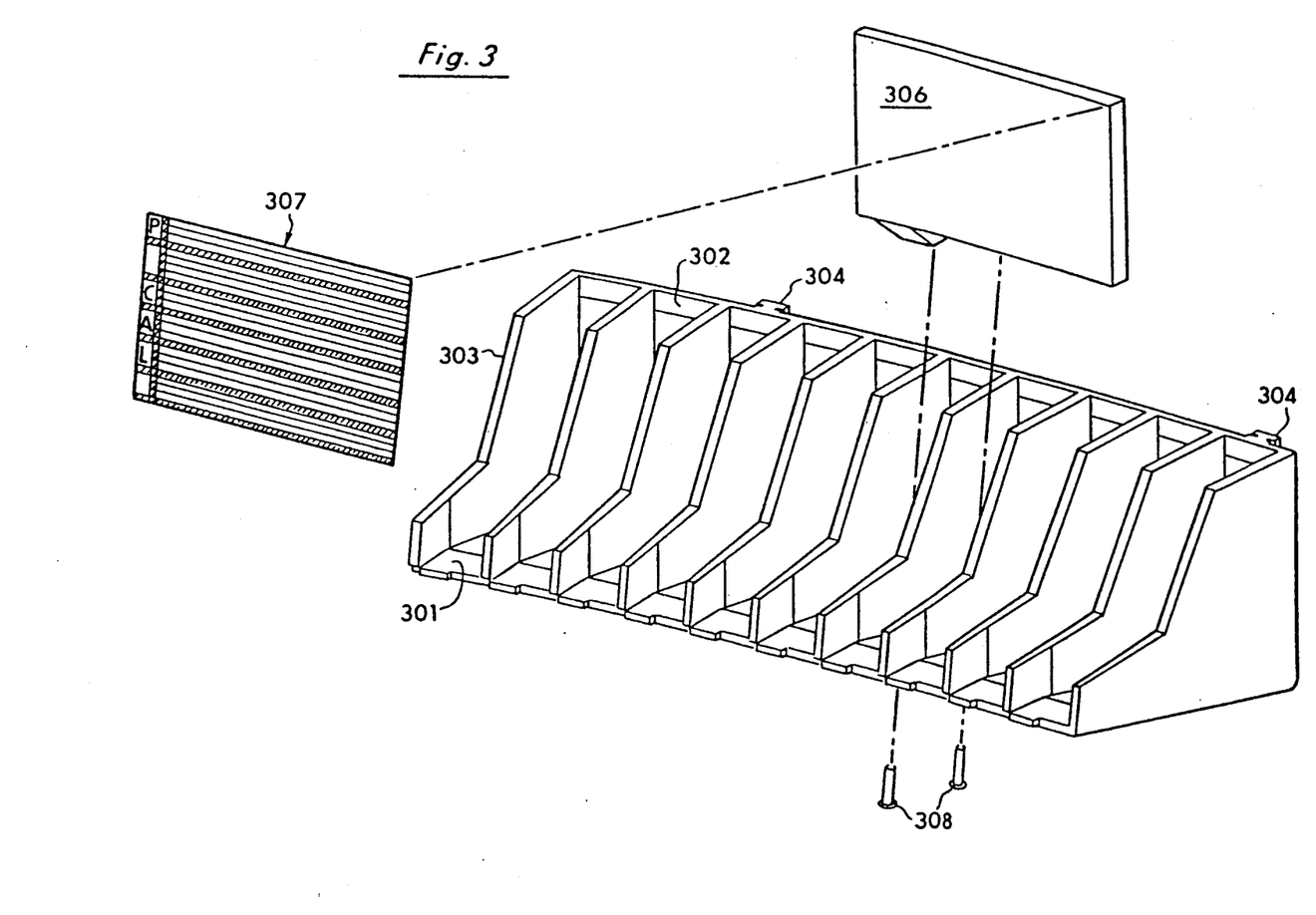
FIG. 3 illustrates the apparatus used for the calibration of the vision system.

FIG. 3 illustrates the apparatus used for the calibration of the vision system. A set of standard tape cartridge storage cells are adapted for use for the calibration process. These tape cartridge storage cells consist of a bottom portion 301, a back portion 302 with intervening wall segments 303, to provide a plurality of slots or cells for the storage of the magnetic tape cartridges. Bottom portion 301 of the cartridge storage cells is angled downward, front to back, so that a magnetic tape cartridge placed in this storage cell tends to slide along the bottom portion 301 into the storage cell. The wall segments 303 are adapted for access by the hand and finger assemblies 240 of the robot arm 230. In addition, attachment apparatus such as hooks 304 formed at the rear of the array of storage cells can be used to suspend the tape cartridge cells from the wall segments of the library module. Each of the magnetic tape cartridge storage cells also includes a robot arm positioning target that consists of a vertically oriented bar target 311 and a horizontally oriented bar target 312. These two bar targets 311, 312 form an L-shaped target to provide a fine positioning target for the robot arm 230 as detected by vision system 101.

The calibration target consists of a flat, rectangular shaped target plate 306 which includes a mounting bracket 305 that is inserted into one of the tape cartridge storage cells and secured in place by two screws 308. Thus, the calibration target plate 306 is positioned across the openings of several of the tape cartridge storage cells. Affixed to calibration target plate 306 is a calibration target label 307 that is imprinted with machine-readable and human-readable characters arranged in a format similar to that of label 400. A significant difference is that the bar code characters imprinted on calibration target label 307 extend over a much wider field than label 400. This is because calibration target label 307 spans several tape cartridge storage cells and the bar code characters must be readable by vision system 101 at whatever one of the tape cartridge storage cells spanned by calibration target label 307 the robot arm 230 positions the vision system 101.

There are two additional vision system illumination calibration targets (not shown) that consist of calibration target plates (like 306) one with a solid white calibration target label and one with a solid black calibration target label affixed thereto. The function of these two additional calibration target labels are discussed below.

Calibration Process—Basic Operational Test

Figure 6:
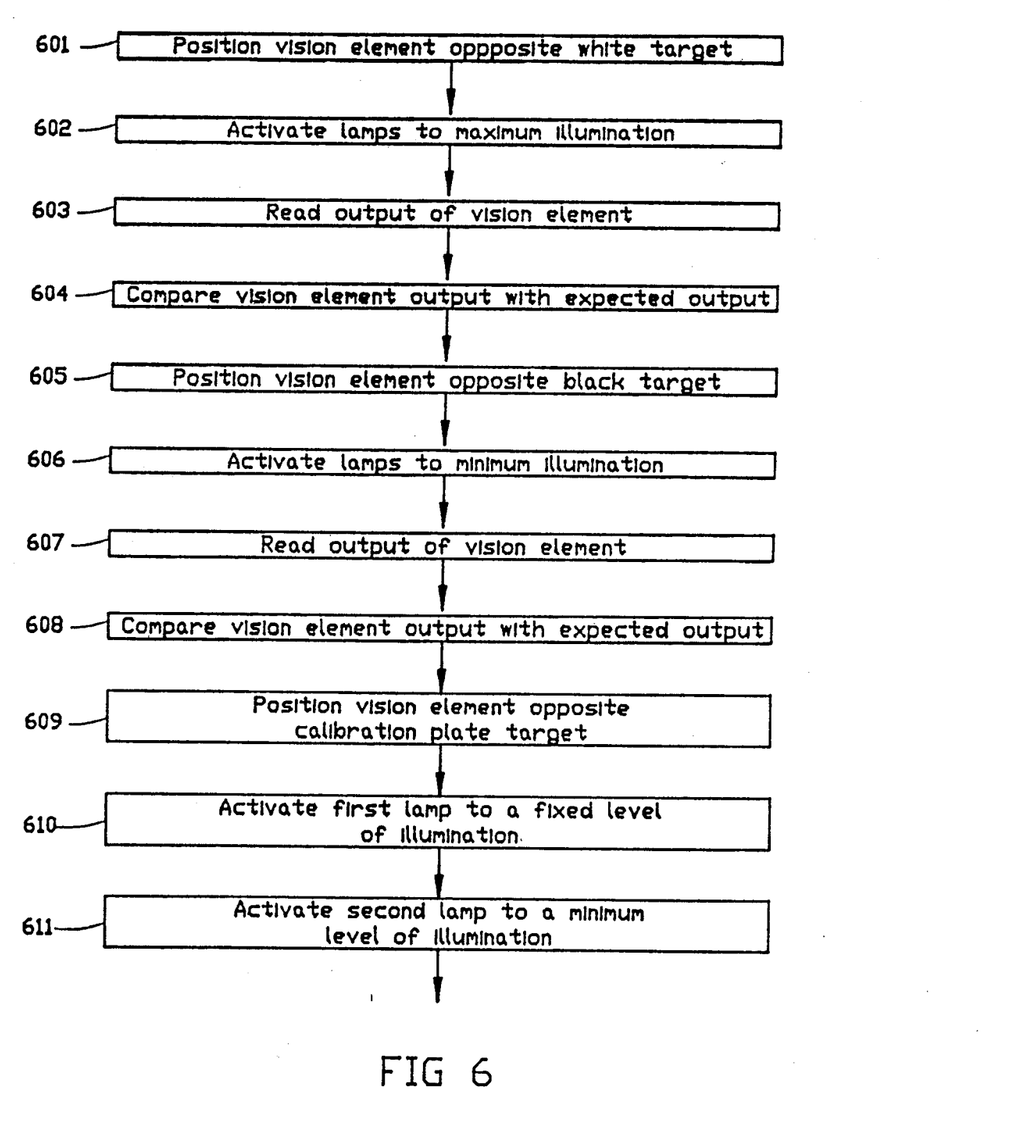
FIGS. 6 and 7 illustrate in flow diagram form the operational steps taken in the calibration of this vision system.

FIG. 6 illustrates in flow diagram form the operational steps taken in the calibration of the vision system 101. At step 601, the control software for the robot arm assembly 230 moves the theta arm 321 and the Z mechanism 323 so that the roll and reach mechanisms and the associated vision element 110 are aligned in a position opposite the white calibration target label. Illumination level control software activates both lamps 111 and 112 to a maximum level of illumination by transmitting data signals to digital to analog converters 501 and 502 indicating that maximum illumination is required. At step 603, an electrical signal is applied to the charge coupled device array of photo detectors 110 and the light value at each photo detector is sequentially read out. Since it is a solid white label and maximum illumination is provided, all of the photo detectors in the charge coupled device array 110 should read out a 1 value indicating a light area is detected. At step 604, the control software compares the output of each one of the photo detectors in the charge coupled device array 110 to insure that all of these photo detectors are operational and are outputting a 1 value.

Once this comparison is successfully completed, control passes to step 605 where the robot arm assembly 230 is signaled to reposition the vision element 110 opposite the solid black calibration target label. Once the robot arm assembly 230 repositions the vision element 110 opposite this target plate at step 606, the control software reduces the level of illumination to a minimum level by transmitting data to digital to analog converters 501, 502 indicating a minimum level of illumination is required. Digital to analog converters 501, 502, as described above, reduce the illumination level of associated lamps 111 and 112 to the minimum level signalled by control software at step 606. At step 607, the control software applies an electrical signal to the charge coupled device array of photo detectors 110 to read out the light value at each photo detector. The values sequentially read out are compared at step 608 to determine whether all of the photo detectors are outputting a zero signal since a solid black calibration target label with minimum illumination is provided. If all of the photo detectors indicate a zero output level, then the photo detectors in the charge coupled device array 110 are all operational and the vision element 110 is ready for further calibration.

Lamp Calibration—Label

The use of calibration target plate 306 having a calibration target label 307 affixed thereto, which label contains a preprinted or predetermined set of characters imprinted thereon in bar code format is now used to provide further calibration of the vision system. The label 307 is similar in configuration to label 400, however the bar code section is significantly wider for calibration purposes as discussed above. At step 609, the control software signals the robot arm assembly 230 to reposition the vision element 110 opposite the calibration plate target 306 which contains a label 307 containing machine-readable characters such as (P, C, A, L) imprinted thereon. Once the vision element 110 is positioned opposite this predetermined calibration target label 307, at step 610 the control software fixes the illumination level of a first one of the lamps 111, to a predetermined level of illumination. This level is maintained throughout the remainder of the calibration process. At step 611, the control software reduces the illumination level of the other lamp 112 to a minimum level of illumination. The control software then enters a loop consisting of a series of sequential steps wherein the level of illumination is sequentially increased by a predetermined amount up to a maximum level. The output of the vision element 110 is read at each of these levels and compared with a set of data stored in memory to determine whether the vision element 110 is accurately reading the predefined calibration target label 307 on the calibration target plate 306.

At step 612, an electrical signal is compared to the charge coupled device array output signal level of the photo detectors 110 and the light value at each photo detector is sequentially read out. At step 613, the output of the photo detectors is applied to a software algorithm which translates the photo detector outputs into a determination of a pattern of bars and spaces which correspond to the bar code imprinted on the predefined calibration target label 307 of the calibration target plate 306. At step 613, the bar code characteristics determined by the control software are compared with a set of characters stored in a table in the memory of the control circuitry. The data stored in the table is a list of characters corresponding to the bar code printed on the predefined calibration target label 307 of calibration target plate 306. The results of this comparison are stored in a memory which is indexed according to the level of illumination of lamp 112.

Software control proceeds to step 614 where the level of illumination is compared with a maximum level of illumination. If the level of illumination used in this particular sequence is at the maximum level, then the test is completed and processing proceeds to step 616. However, since this is the first cycle or step in the calibration process, the illumination level is not at the maximum level but is presently at the minimum level. Therefore, control passes to step 615 where the results of the comparison operation performed at step 613 are analyzed. If the vision element output matches the table of label characters, control advances to step 616 where a determination is made of whether this is the first match to occur in the series of illumination level increases. If not, control advances to step 619, otherwise at step 617 the lamp level of illumination is stored in memory as an indication of the minimum requires level of illumination and then control advances to step 619. At step 619, the level of illumination of lamp 112 is increased one step and processing proceeds back to step 612.

If at step 615 there was not a match between the vision element output and the table of label characters, control passes to step 618 where a determination is made of whether this is the first match to occur in the series of illumination level increases. If it is not, processing advances to step 620, described below. If it is the first match to occur in the series of illumination level increases, control passes to step 619 where the level of illumination of lamp 112 is increased one step and processing proceeds back to step 612. This cycle of reading the output of the charge coupled device array of photo detectors 110, and comparing the output with a set of data stored in memory continues until a level of illumination reaches the maximum level as defined in this system.

Analysis of Calibration Test Results

Figure 7:
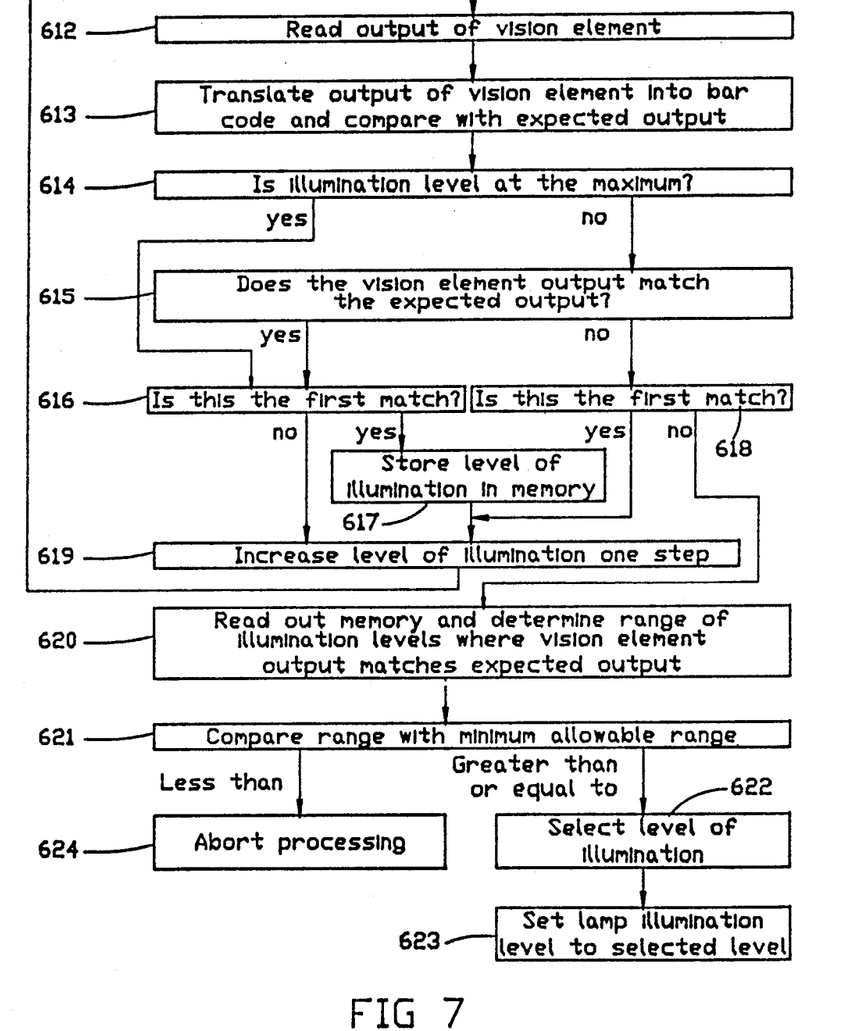

Once the maximum level has been reached, processing proceeds to step 620 where the set of comparison results of step 613 are read out of memory. The results read out of memory at step 620 are used to determine the range of levels of illumination wherein the set of characters read by the vision element 110 consistently and accurately matches with the set of characters stored in memory. This range of consistent accurate label reading indicates the range of levels of illuminations that provide an accurate output from the vision system 101. At step 621, the control software compares the determined range with a predefined unsigned integer value stored in memory to insure that there are at least a minimum number of levels of illumination within this range where the data imprinted on the machine-readable label can be accurately read. If the range of values of levels of illumination is less than this predefined number, then control passes to step 624 and the calibration process is aborted because there are an insufficient number of levels of illumination wherein the machine-readable label can be accurately scanned. An error message is transmitted to the library control to indicate the failure to calibrate the vision system 101.

If the number of levels of illumination within the range is greater than or equal to the number n predefined in memory, processing proceeds to step 622 where the control software selects a level of illumination within this range of values. A typical selection might be taking the average or median value of illumination between the first or minimum level of illumination at which the machine-readable label was first accurately and consistently read by the vision element 110 and the maximum level of illumination. Once this value or level of illumination has been selected, processing advances to step 623 where the level of illumination of lamp 112 is set to this value and a control message is transmitted to the library control to indicate that the vision system calibration has been successfully completed. The automated library system can then proceed to retrieve and replace magnetic tape cartridges in the various tape cartridge storage cells since the vision system can accurately read the labels imprinted on the magnetic tape cartridges to identify the magnetic tape cartridge and insure that these cartridges are accurately placed in their corresponding storage cells.

Thus, the vision system calibration apparatus proceeds through a number of sequential steps to provide a level of illumination wherein the vision element can accurately read the machine-readable characters on the label imprinted on the end of the magnetic tape cartridge. This process selects a level of illumination for the vision system that will improve the probability of the vision element accurately reading the machine-readable labels.

While a specific embodiment of this invention has been disclosed herein, it is expected that those skilled in the art can design other embodiments that differ from this particular embodiment but fall within the scope of the appended claims.

I claim:

1. An object handling system for robotically storing and retrieving a plurality of objects therein, comprising:
   a plurality of object storage locations, each of which includes an opening for transferring an object into/out of said object storage location;
   robot means for transporting objects between said object storage locations, wherein said robot includes:
     means for retrieving an object stored in a selected object storage location,
     means for producing a visual image of said opening associated with said selected object storage location,
     a source of illumination associated with said image producing means to illuminate said selected object storage location, and
     means responsive to said visual image of said associated opening for positioning said retrieving means opposite said associated opening;
   calibration target means; and
   means, responsive to the positioning of said vision element opposite said calibration target means for calibrating said vision system.

2. The apparatus of claim 1 wherein each of said object storage locations includes a two dimensional target located adjacent to said associated opening, said positioning means includes:
   means responsive to said producing means for generating data indicative of said illuminated associated opening identifying said two dimensional target;
   means responsive to said identifying means for computing the offset between said two dimensional target and a preset position; and
   means responsive to said computing means for translating said retrieving means a distance equal to said offset.

3. The apparatus of claim 1 wherein said calibration target means includes a set of machine readable data thereon, said calibrating means includes:
   means for stepwise sequentially increasing the level of illumination produced by said source of illumination from a first of a plurality of predefined levels to a last of said plurality of predefined levels;
   means for storing a set of data representative of said set of machine-readable data imprinted on said calibration target means;
   means responsive to said increasing means for comparing said set of machine-readable data identified by said vision element at each of said plurality of levels of illumination with said stored set of data; and
   means responsive to said comparing means for setting said source of illumination to operate at a level of illumination greater than or equal to the one of said plurality of levels of illumination at which said comparing means first consistently determines that said identified set of machine-readable data match said stored set of data.

4. The apparatus of claim 3 further including:
   means responsive to said comparing means for disabling said setting means if said comparing means fails to match said read characters with said stored set of characters for greater than a predetermined number of sequential levels of illumination.

5. The apparatus of claim 3 wherein said machine-readable data comprise a bar code.

* * * * *